United States Patent
Luo

(10) Patent No.: US 8,508,938 B2
(45) Date of Patent: Aug. 13, 2013

(54) PORTABLE COMPUTER WITH A HEAT DISSIPATING STAND

(75) Inventor: Yi-Chieh Luo, New Taipei (TW)

(73) Assignee: Wistron Corporation, Xizhi Dist., New Taipei (TW)

( * ) Notice: Subject to any disclaimer, the term of this patent is extended or adjusted under 35 U.S.C. 154(b) by 13 days.

(21) Appl. No.: 13/296,198

(22) Filed: Nov. 14, 2011

(65) Prior Publication Data

US 2012/0176742 A1 Jul. 12, 2012

(30) Foreign Application Priority Data

Jan. 6, 2011 (TW) .............................. 100100500 A

(51) Int. Cl.
*G06F 1/16* (2006.01)
*G06F 3/02* (2006.01)
*G09G 5/00* (2006.01)

(52) U.S. Cl.
USPC ................. 361/679.59; 361/679.55; 345/156; 345/169; 345/905

(58) Field of Classification Search
USPC ............. 361/679.55–679.59, 679.01–679.45; 455/575.1, 575.4, 575.3; 345/156, 157, 168, 345/169, 905; 248/917–924; 312/223.1, 312/223.2, 351.3
See application file for complete search history.

(56) References Cited

U.S. PATENT DOCUMENTS

| | | | | |
|---|---|---|---|---|
| 6,053,589 A * | 4/2000 | Lin | ................................ | 312/271 |
| 7,566,043 B2 * | 7/2009 | Chen | ............................. | 248/616 |
| 7,576,981 B2 * | 8/2009 | Kuo | .......................... | 361/679.59 |
| 8,023,040 B2 * | 9/2011 | Zhou | ............................. | 348/376 |
| 8,111,512 B2 * | 2/2012 | Yeh et al. | ................. | 361/679.59 |
| 8,335,079 B2 * | 12/2012 | Yeh | ............................ | 361/679.56 |
| 2010/0149752 A1 * | 6/2010 | Lian | ........................ | 361/679.59 |

FOREIGN PATENT DOCUMENTS

TW 423673 2/2001

OTHER PUBLICATIONS

Office action mailed on Apr. 11, 2013 for the Taiwan application No. 100100500, filing date: Jan. 6, 2011, p. 1 line 10~14, p. 2 and p. 3 line 1~4.

* cited by examiner

*Primary Examiner* — Jayprakash N Gandhi
*Assistant Examiner* — Nidhi Desai
(74) *Attorney, Agent, or Firm* — Winston Hsu; Scott Margo

(57) ABSTRACT

A portable computer includes a host module having a host housing. A slot is formed on the host housing, and the slot includes a first fixing end and a second fixing end. The portable computer further includes a display module pivoted to the host module, and a heat dissipating stand installed inside the slot on the host housing in a slidable manner. When an end of the heat dissipating stand is fixed on the first fixing end of the slot, the heat dissipating stand is contained inside the slot completely. When the end of the heat dissipating stand is fixed on the second fixing end of the slot, the other end of the heat dissipating stand protrudes out of the slot and is disposed under the host housing so as to lift the host module.

9 Claims, 8 Drawing Sheets

PORTABLE COMPUTER WITH A HEAT DISSIPATING STAND

BACKGROUND OF THE INVENTION

1. Field of the Invention

The present invention relates to a portable computer with a heat dissipating stand, and more particularly, to a portable computer with a heat dissipating stand with both heat dissipating and carrying functions.

2. Description of the Prior Art

Since portable computers are getting more and more popular, not only performance but also aesthetic feeling of the portable computers is improving so as to meet consumer's demands. In the mechanical design of the portable computers, foot cushions disposed on a bottom of a host module are mainly to boost the portable computer for the sake not only of preventing the bottom of the portable computer from being scratched, but also of enlarging a gap between the host module and a supporting surface so as to enhance a convection effect for the bottom of the portable computer. As a result, increase of heat dissipating efficiency can be achieved. Furthermore, the foot cushions can lift the keyboard mechanism as well as boost a liquid crystal display module for comforting a user's shoulder, neck and so on when typing, so as to satisfy designs for ergonomics. Accordingly, the foot cushions make users feel more comfortable when operating the portable computer. However, when the portable computer is not in use, the foot cushions increase thickness of the portable computer so as to affect aesthetic feeling of appearance.

SUMMARY OF THE INVENTION

The present invention provides a portable computer with a heat dissipating stand with both heat dissipating and carrying functions for solving above drawbacks.

According to the claimed invention, a portable computer includes a host module including a host housing whereon a slot including a first fixing end and a second fixing end is formed, a display module pivoted to the host module, and a heat dissipating stand installed inside the slot on the host housing in a slidable manner. The heat dissipating stand is contained inside the slot completely when an end of the heat dissipating stand is fixed on the first fixing end, and the other end of the heat dissipating stand protrudes out of the slot and is disposed under the host housing so as to lift the host module when the end of the heat dissipating stand is fixed on the second fixing end of the slot.

According to the claimed invention, the first fixing end and the second fixing end of the slot are respectively arc-shaped openings.

According to the claimed invention, the heat dissipating stand includes at least one foot base for contacting a surface supporting the portable computer.

According to the claimed invention, the foot base is a wave-shaped structure.

According to the claimed invention, the heat dissipating stand is a U-shaped structure and the slot is a U-shaped slot.

According to the claimed invention, the end of the heat dissipating stand is fixed inside the first fixing end or inside the second fixing end of the slot in a rotatable manner, so that the heat dissipating stand is capable of rotating to expose out of the host housing partly, for providing the portable computer with carrying function.

According to the claimed invention, the portable computer further includes a fixing mechanism for fixing the heat dissipating stand when the heat dissipating stand rotates to expose out of the host housing partly.

According to the claimed invention, the fixing mechanism includes at least one fixing hole formed on the heat dissipating stand, and at least one hook disposed on the display module for engaging inside the fixing hole when the heat dissipating stand rotates to expose out of the host housing partly, so as to fix the heat dissipating stand.

According to the claimed invention, an angle substantially equal to 180 degrees is formed between a position where the heat dissipating stand is contained inside the slot completely and a position where the heat dissipating stand rotates to partly exposed out of the host housing.

According to the claimed invention, the heat dissipating stand includes at least one foot base for contacting a surface supporting the portable computer when the other end of the heat dissipating stand protrudes out of the slot and is disposed under the host housing.

The heat dissipating stand of the present invention is contained inside the slot on the host housing when being not in use, so as to protect the heat dissipating stand, to reduce occupied space and to keep aesthetic feeling of appearance. When the other end of the heat dissipating stand is pulled out and protrudes from the slot for lifting the host housing, it can not only prevents a bottom of the portable computer from being scratched, but also enlarge a gap between the host module and the surface supporting the portable computer, so as to enhance a convection effect of the bottom of the portable computer. As a result, increase of heat dissipating efficiency can be achieved. Furthermore, the heat dissipating stand can adjust the angle for the keyboard module as well as enhance the height for the display module in use for comforting a user's shoulder, neck and so on when typing, so as to satisfy designs for ergonomics. Accordingly, the heat dissipating stand with ergonomic function make users feel more comfortable when operating the portable computer. In conclusion, the heat dissipating stand provides not only structural designs for heat dissipation and ergonomics, but also provides carrying function as being a handle of the portable computer.

These and other objectives of the present invention will no doubt become obvious to those of ordinary skill in the art after reading the following detailed description of the embodiment that is illustrated in the various figures and drawings.

DETAILED DESCRIPTION

Figure 1:
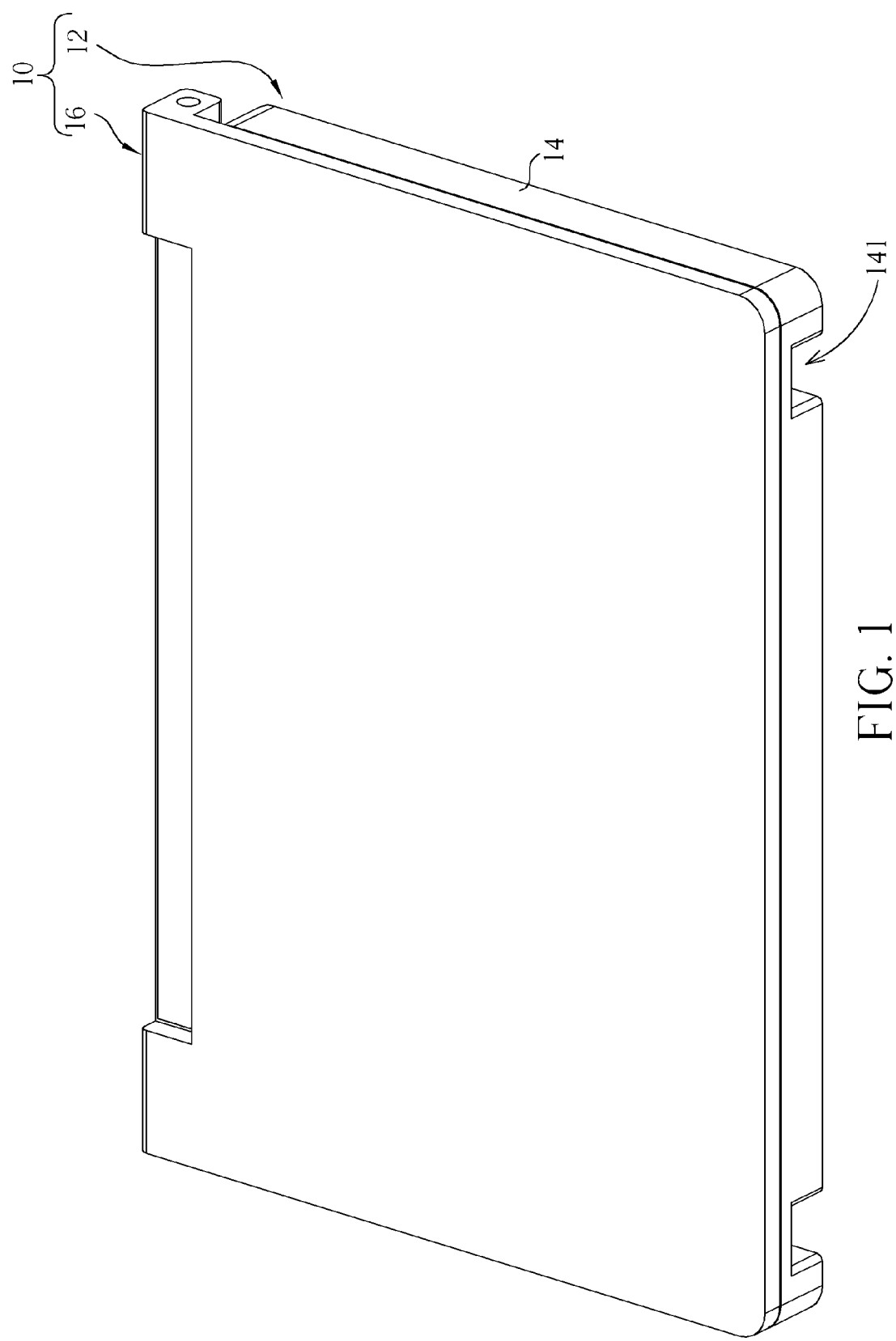
FIG. 1 and FIG. 2 are respectively schematic drawings of a portable computer in different views according to an embodiment of the present invention.
Figure 2:
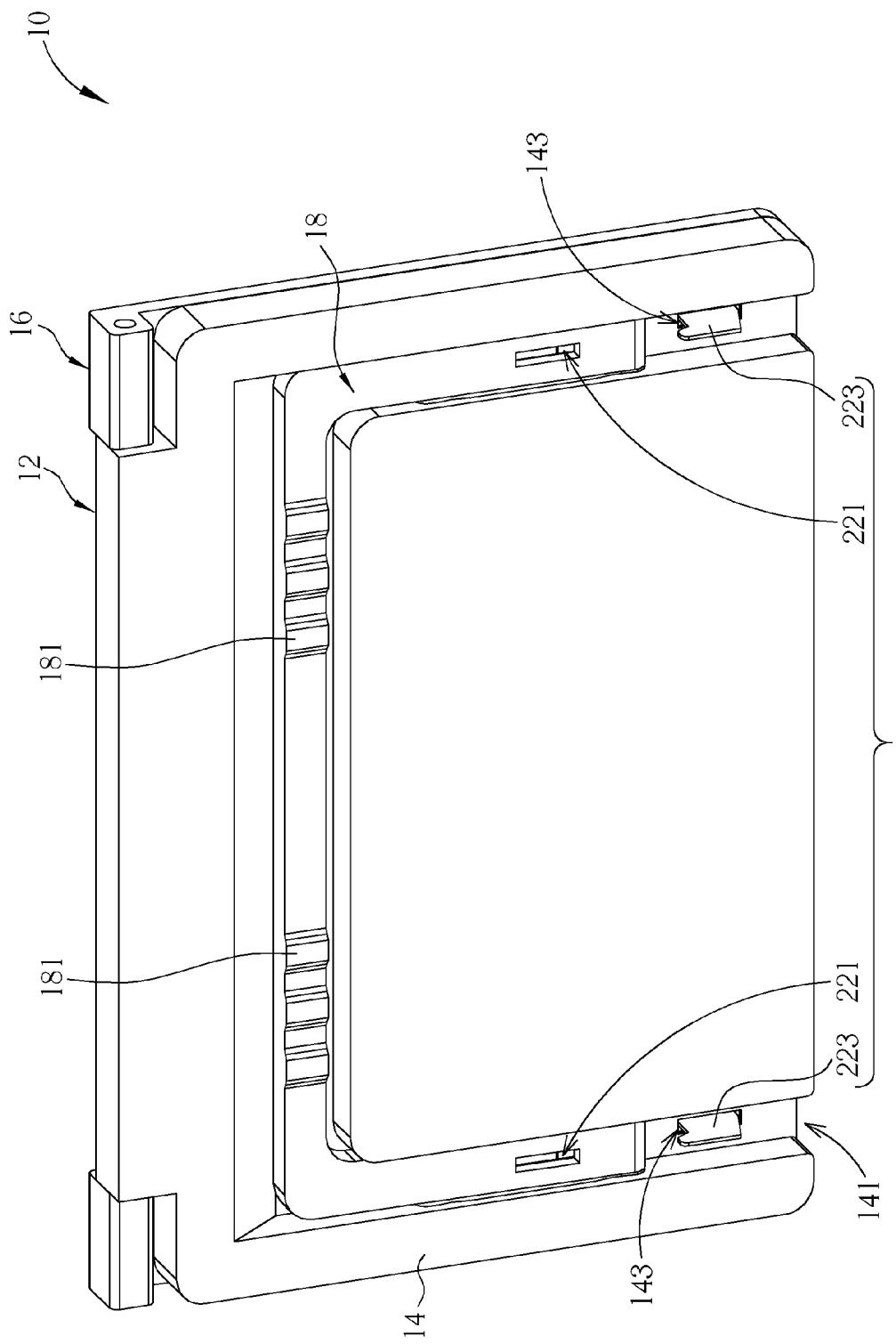

Please refer to FIG. 1 and FIG. 2. FIG. 1 and FIG. 2 are respectively schematic drawings of a portable computer 10 in different views according to an embodiment of the present invention. The portable computer 10 can be a notebook computer and so on. The portable computer 10 includes a host module 12 including a host housing 14 for covering internal components of the host module 12. A slot 141 is formed on the host housing 14. The portable computer 10 further includes a display module 16 pivoted to the host module 12. The display module 16 can be a liquid crystal display. The portable computer 10 further includes a heat dissipating stand 18 installed inside the slot 141 on the host housing 14 in a slidable manner. The heat dissipating stand 18 can be a U-shaped structure, i.e. can be in handle shape for carrying. The slot 141 can be a corresponding U-shaped slot. The heat dissipating stand 18 can be made of metal or plastic material. The heat dissipating stand 18 includes at least one foot base 181 for contacting a surface supporting the portable computer 10. The foot base 181 can be a wave-shaped structure. In this embodiment, the heat dissipating stand 18 includes two foot bases 181, and the number and the disposal of the foot bases 181 are not limited to those illustrated in this embodiment. It depends on practical demands.

Figure 3:
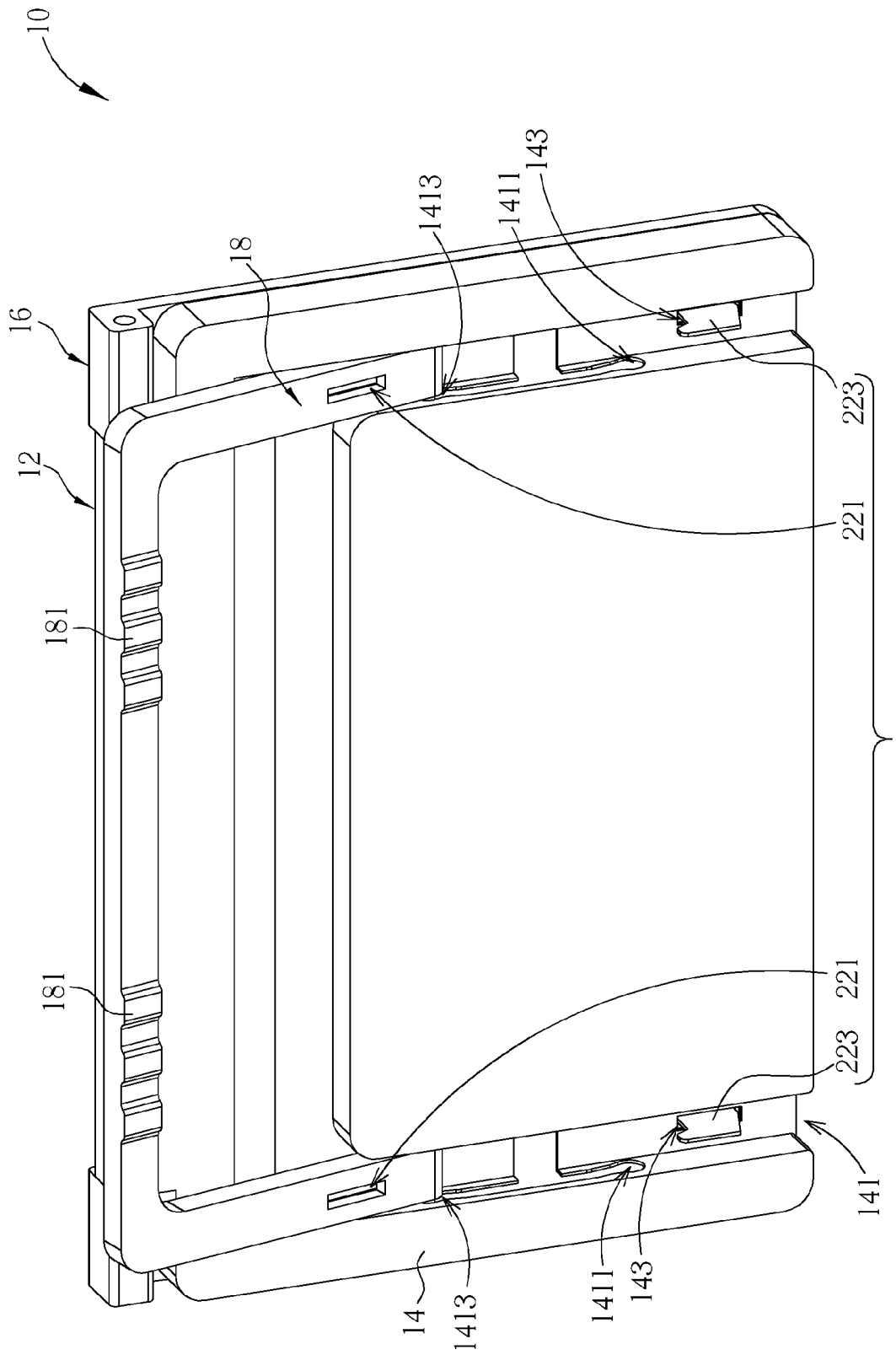
FIG. 3 and FIG. 4 are schematic drawings respectively illustrating a heat dissipating stand being pulled out from a slot in different views according to the embodiment of the present invention.
Figure 4:
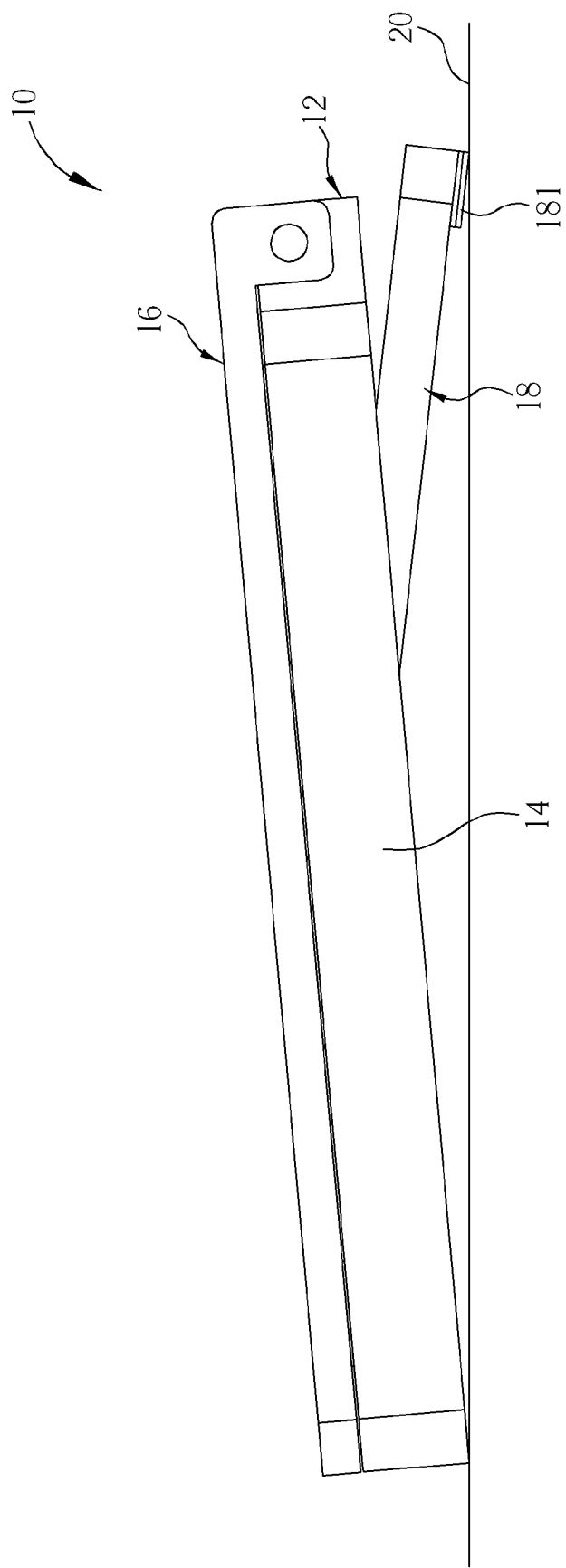
Figure 5:
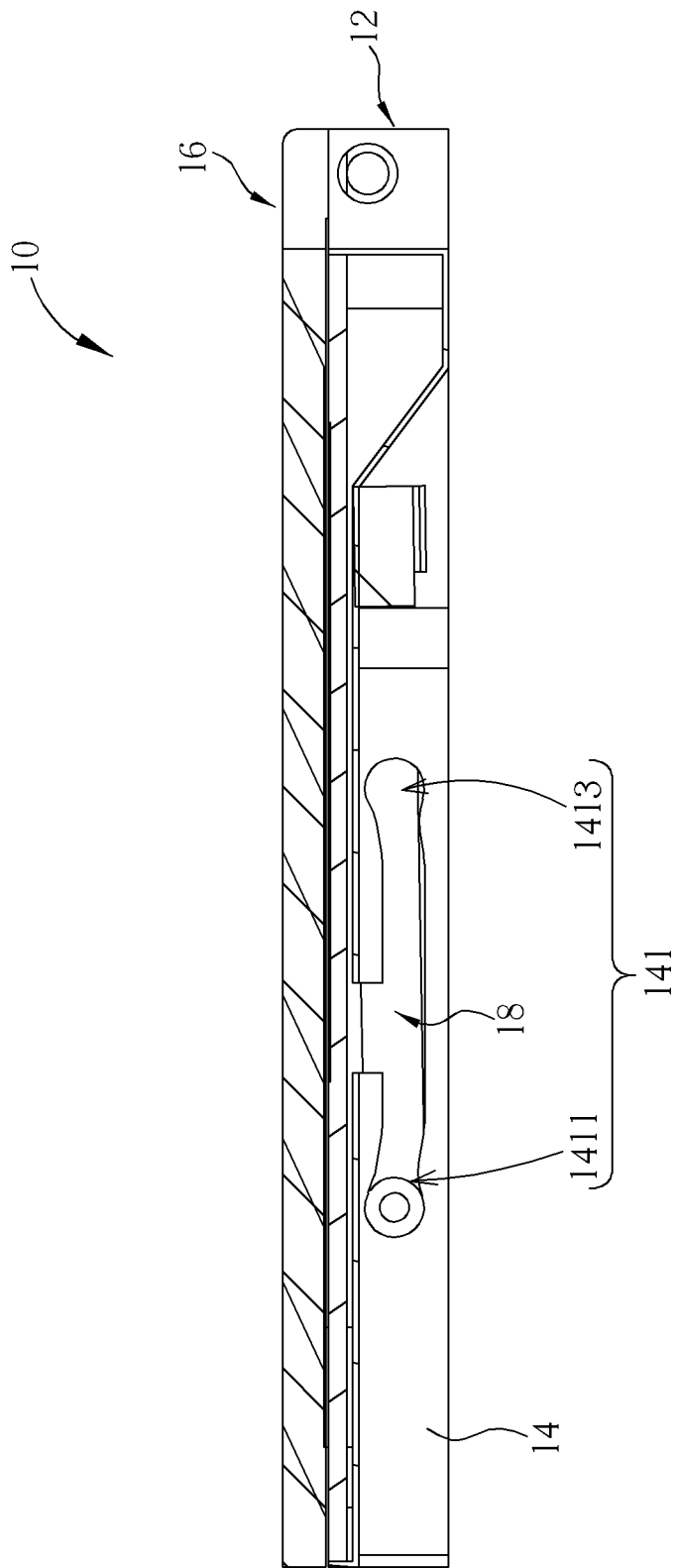
FIG. 5 and FIG. 6 are sectional drawings respectively illustrating the heat dissipating stand being completely contained inside the slot and being pulled out of the slot in different views.
Figure 6:
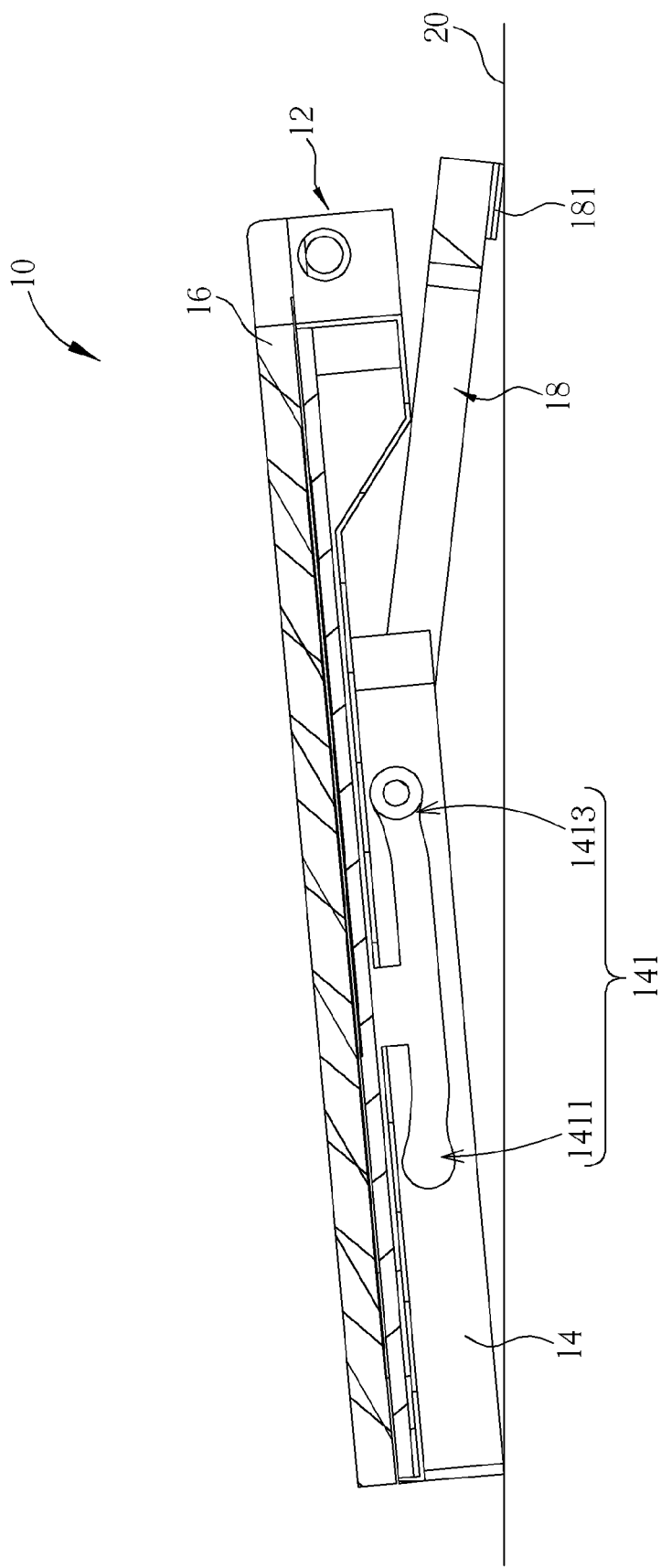

Please refer to FIG. 2 to FIG. 6. FIG. 3 and FIG. 4 are schematic drawings respectively illustrating the heat dissipating stand 18 being pulled out from the slot 141 in different views according to the embodiment of the present invention. FIG. 5 and FIG. 6 are sectional drawings respectively illustrating the heat dissipating stand 18 being completely contained inside the slot 141 and being pulled out of the slot 141 in different views. The slot 141 on the host housing 14 includes a first fixing end 1411 and a second fixing end 1413 on two sides, respectively. The first fixing end 1411 and the second fixing end 1413 can be respectively arc-shaped openings, so that an end of the heat dissipating stand 18 can be stably fixed inside the first fixing end 1411 and the second fixing end 1413 of the slot 141 without falling out easily. As shown in FIG. 2 and FIG. 5, when the end of the heat dissipating stand 18 is fixed on the first fixing end 1411 of the slot 141, the heat dissipating stand 18 is contained inside the slot 141 completely for protecting the heat dissipating stand 18 and for keeping aesthetic feeling of appearance of the portable computer 10.

As shown in FIG. 3, FIG. 4 and FIG. 6, when heat dissipating efficiency of the portable computer 10 is to be enhanced by using the heat dissipating stand 18, the heat dissipating stand 18 can be pulled to backward so as to protrude out of the host housing 14, i.e. the end of the heat dissipating stand 18 is moved from the first fixing end 1411 to the second fixing end 1413 of the slot 141. When the end of the heat dissipating stand 18 is fixed on the second fixing end 1413 of the slot 141, the other end of the heat dissipating stand 18 protrudes out of the slot 141 and is disposed under the host housing 14 so as to lift the host module 12. In such a manner, it can not only prevent a bottom of the host housing 14 from being scratched, but also increase a gap between the host module 12 and a supporting surface 20, so as to enhance a convection effect of the bottom of the portable computer 10. As a result, it contributes to increase heat dissipating efficiency of the portable computer 10. Furthermore, the mechanism of which the other end of the heat dissipating stand 18 protrudes out of the slot 141 to lift the host module 12 can adjust the inclined angle for a keyboard module as well as enhance the height for the display module 16 of the portable computer 10 in use for comforting the user's shoulder, neck and so on when typing, so as to satisfy designs for ergonomics. In addition, the present invention is capable of adjusting the angle formed between the host module 12 and the supporting surface 20 by adjusting the heat dissipating stand 18 pulled out of the slot 141, so that the mechanism of the portable computer 10 is more flexible. In addition, by the structure design for the foot base 181 of the heat dissipating stand 18, such as a wave-shaped structure, the heat dissipating stand 18 can stably fix the portable computer 10 on the supporting surface 20.

Figure 7:
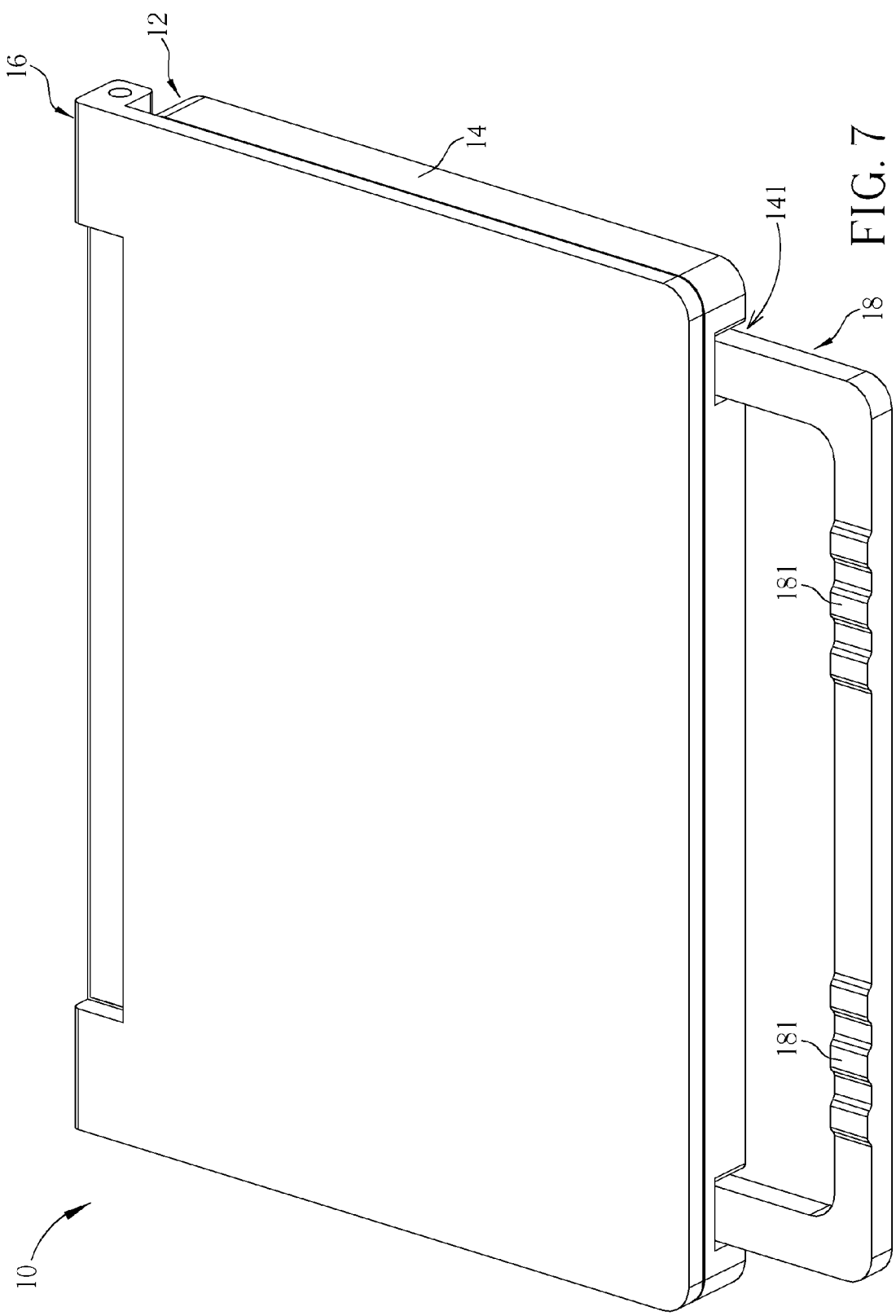
FIG. 7 and FIG. 8 are schematic drawings illustrating the heat dissipating stand being a handle in different views according to the embodiment of the present invention.
Figure 8:
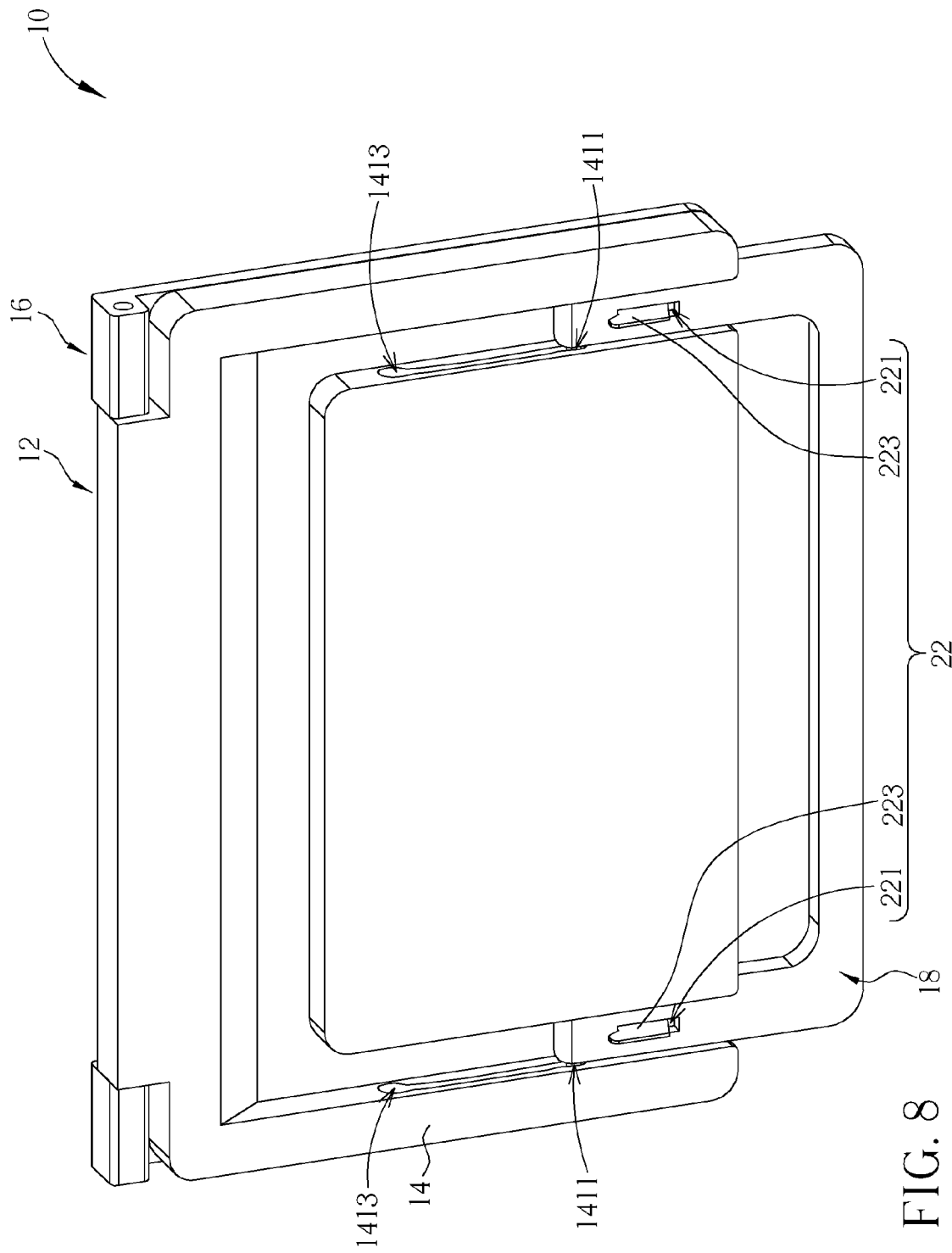

In addition to heat dissipation and structural design for ergonomics, the heat dissipating stand 18 can further be a handle for the user to carry the portable computer 10. Please refer to FIG. 7 and FIG. 8. FIG. 7 and FIG. 8 are schematic drawings illustrating the heat dissipating stand 18 being a handle in different views according to the embodiment of the present invention. When the user wants to hand carry the portable computer 10, the heat dissipating stand 18 can be rotated from a position as shown in FIG. 2 to a position as shown in FIG. 8 for exposing out of the host module 12, wherein an angle substantially equal to 180 degrees can be formed between a position where the heat dissipating stand 18 is contained inside the slot 141 completely and a position where the heat dissipating stand 18 rotates to partly exposed out of the host housing 14. As mentioned above, the end of the heat dissipating stand 18 is fixed on the first fixing end 1411 of the slot 141 in a rotatable manner, so that the heat dissipating stand 18 is capable of rotating to expose out of the host housing 14 partly, for providing the portable computer 10 with carrying function. Alternatively, the present invention also can provide the heat dissipating stand 18 with the end thereof being fixed on the second fixing end 1413 of the slot 141 in a rotatable manner, so that the heat dissipating stand 18 is capable of rotating to expose out of the host housing 14 partly. It depends on the practical demands. In addition, in order to stably fix the heat dissipating stand 18 as being the handle of the portable computer 10, so as to prevent the heat dissipating stand 18 from sliding relative to the host housing 14, the portable computer 10 further includes a fixing mechanism 22 for fixing the heat dissipating stand 18 when the heat dissipating stand 18 rotates to expose out of the host housing 14 partly. For example, an opening 143 is formed on the host housing 14, and the fixing mechanism 22 includes at least one fixing hole 221 formed on the heat dissipating stand 18. The fixing mechanism 22 further includes at least one hook 223 disposed on the display module 16. The hook 223 on the display module 16 engaging with the opening 143 on the host housing 14 can be a latch mechanism for latching the display module 16 on the host module 12. As shown in FIG. 8, the hook 223 is used for passing through the opening 143 on the host housing and for engaging inside the fixing hole 221 when the heat dissipating stand 18 rotates to expose out of the host housing 14 partly, so as to fix the heat dissipating stand 18 on the host housing 14. The mechanism for fixing the heat dissipating stand 18 on the host housing 14 is not limited to structure of the hook mentioned above. It can be other fixing mechanisms, such as a magnetic mechanism, and depends on the practical demands.

Compared with the prior art, the heat dissipating stand of the present invention is contained inside the slot on the host housing when being not in use, so as to protect the heat dissipating stand, to reduce occupied space and to keep aesthetic feeling of appearance. When the other end of the heat dissipating stand is pulled out and protrudes from the slot for lifting the host housing, it can not only prevents a bottom of the portable computer from being scratched, but also enlarge a gap between the host module and the surface supporting the portable computer, so as to enhance a convection effect of the bottom of the portable computer. As a result, increase of heat dissipating efficiency can be achieved. Furthermore, the heat dissipating stand can adjust the angle for the keyboard module as well as enhance the height for the display module in use for comforting a user's shoulder, neck and so on when typing, so as to satisfy designs for ergonomics. Accordingly, the heat dissipating stand with ergonomic function make users feel more comfortable when operating the portable computer. In conclusion, the heat dissipating stand provides not only structural designs for heat dissipation and ergonomics, but also provides carrying function as being a handle of the portable computer.

Those skilled in the art will readily observe that numerous modifications and alterations of the device and method may be made while retaining the teachings of the invention.

What is claimed is:

1. A portable computer, comprising: a host module comprising a host housing, a slot being formed on the host housing and the slot comprising a first fixing end and a second fixing end; a display module pivoted to the host module; and a heat dissipating stand installed inside the slot on the host housing in a slidable manner and not driven by pivotal movement of the display module relative to the host module, the heat dissipating stand being contained inside the slot completely when an end of the heat dissipating stand is fixed on the first fixing end, and the other end of the heat dissipating stand protruding out of the slot and being disposed under the host housing so as to lift the host module when the end of the heat dissipating stand is fixed on the second fixing end of the slot, wherein the end of the heat dissipating stand is fixed inside the first fixing end or inside the second fixing end of the slot in a rotatable manner, so that the heat dissipating stand is capable of rotating to expose out of the host housing partly, for providing the portable computer with carrying function.

2. The portable computer of claim 1, wherein the first fixing end and the second fixing end of the slot are respectively arc-shaped openings.

3. The portable computer of claim 1, wherein the heat dissipating stand comprises at least one foot base for contacting a surface supporting the portable computer.

4. The portable computer of claim 3, wherein the foot base is a wave-shaped structure.

5. The portable computer of claim 1, wherein the heat dissipating stand is a U-shaped structure and the slot is a U-shaped slot.

6. The portable computer of claim 1, further comprising a fixing mechanism for fixing the heat dissipating stand when the heat dissipating stand rotates to expose out of the host housing partly.

7. The portable computer of claim 6, wherein the fixing mechanism comprises:

at least one fixing hole formed on the heat dissipating stand; and at least one hook disposed on the display module for engaging inside the fixing hole when the heat dissipating stand rotates to expose out of the host housing partly, so as to fix the heat dissipating stand.

8. The portable computer of claim 1, wherein an angle substantially equal to 180 degrees is formed between a position where the heat dissipating stand is contained inside the slot completely and a position where the heat dissipating stand rotates to partly exposed out of the host housing.

9. The portable computer of claim 1, wherein the heat dissipating stand comprises at least one foot base for contacting a surface supporting the portable computer when the other end of the heat dissipating stand protrudes out of the slot and is disposed under the host housing.

* * * * *